United States Patent [19]

Foster

[11] Patent Number: 5,238,360
[45] Date of Patent: Aug. 24, 1993

[54] RECIPROCATING FLOOR CONVEYOR WITH LIQUID COLLECTING CHANNELS BETWEEN THE FLOOR MEMBERS

[76] Inventor: Raymond K. Foster, P.O. Box 1, Madras, Oreg. 97741

[21] Appl. No.: 682,463

[22] Filed: Apr. 8, 1991

[51] Int. Cl.[5] .............................................. B65G 25/04
[52] U.S. Cl. .................................. 414/525.9; 198/750
[58] Field of Search ................ 414/525.1, 525.9, 467, 414/507; 198/750, 773–777, 763, 759

[56] References Cited

U.S. PATENT DOCUMENTS

| | | | |
|---|---|---|---|
| 4,144,963 | 3/1979 | Hallstrom | 198/775 |
| 4,492,303 | 1/1985 | Foster | 198/750 |
| 4,611,708 | 9/1986 | Foster | 198/750 |
| 4,679,686 | 7/1987 | Foster | 198/750 |
| 4,749,075 | 6/1988 | Foster | 198/750 |
| 4,785,929 | 11/1988 | Foster | 198/750 |
| 4,858,748 | 8/1989 | Foster | 414/525.1 X |
| 4,896,761 | 1/1990 | Foster | 198/750 |

Primary Examiner—Frank E. Werner
Attorney, Agent, or Firm—Delbert J. Barnard

[57] ABSTRACT

In a reciprocating floor conveyor, a plurality of longitudinal base sections (16) are connected together to form a support and guide structure for the floor members (10). The base structure comprises a plurality of guide beams (18 and 20, 22) which extend longitudinally of the conveyor, and liquid collection channels (14) between adjacent floor members (10). Each floor member (10) is supported on and by an adjacent pair of guide beams (18 and 20, 22). Snap-on bearings (76) are provided, which include cam portions for aiding their snap-on installation onto a top portion (24, 26, 28) of a guide beam (18). The bearings (76) include lock flanges (86, 88) which serve to hold the floor members (10) in place. Each floor member (10) includes a pair of outside walls (112, 114) having inwardly directed lips (120, 122) which confront lower edge portions (102). Each floor member (10) also includes a pair of inside walls (116, 118) having a two stage lock. Inside walls (116, 118) include laterally inwardly directed shoulders (127, 130) which are at the same level as the lips (120, 122). They also include lips (128, 132) at a lower level. The shoulders (127, 130) and lips (128, 132) are positioned to engage the lower edge portions (104) of lock flanges (88) on the bearings (76). The base sections (16) are connected together in the top regions of certain guide beams (20, 22). Each base section (16) includes on one side a groove portion (34) of a tongue and groove joint. On its opposite side it includes a complimentary tongue portion (40) of the joint. The tongue portion (40) of each base section (16) is united with the groove portion (34) of the adjacent base section (16). The components of the joint are constructed to provide an elongated seal strip chamber in the joint when the tongue portion (40) is within a groove portion (34). An elongated seal member (60) is located within this chamber (54). The seal member is compressed and makes tight contact with both a surface of the 35 groove component (34) and a surface of the tongue component (40).

15 Claims, 5 Drawing Sheets

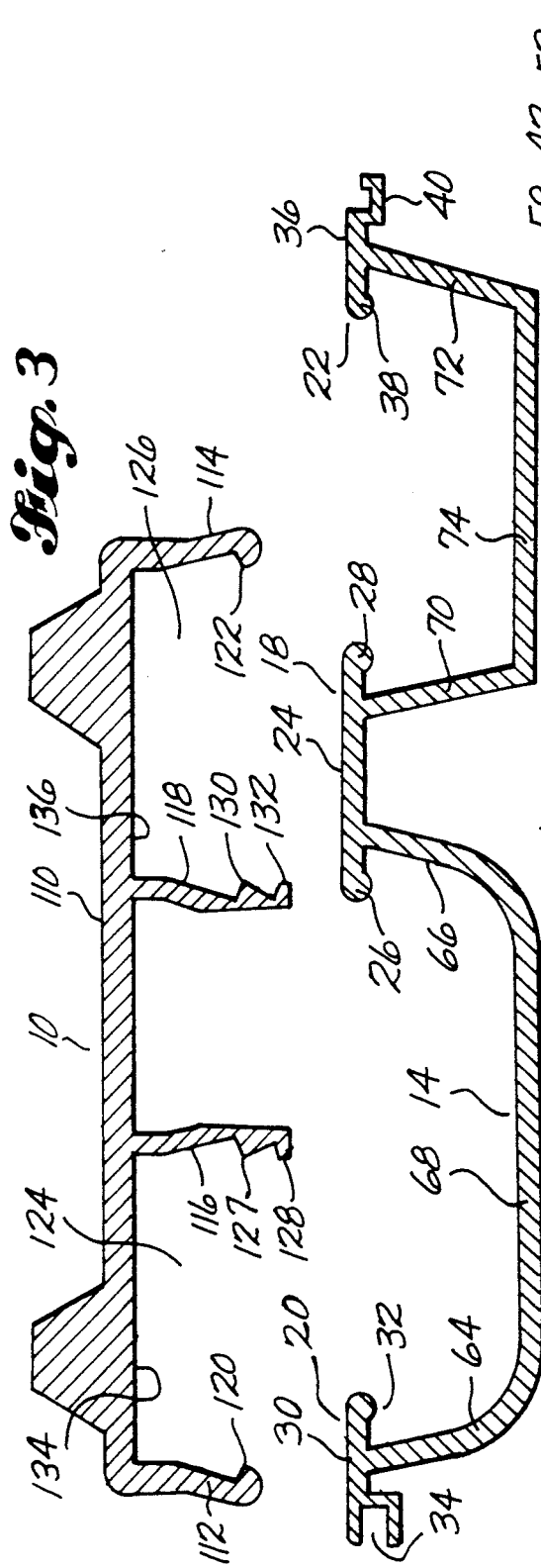
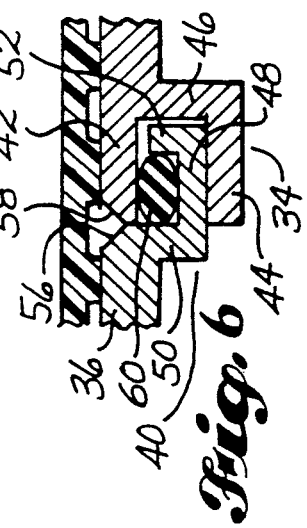
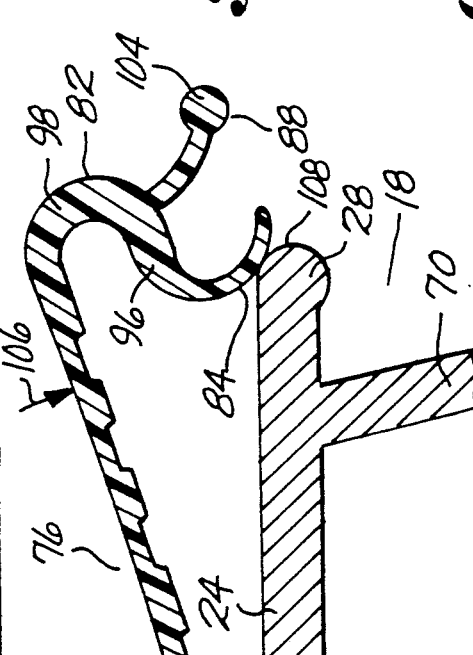

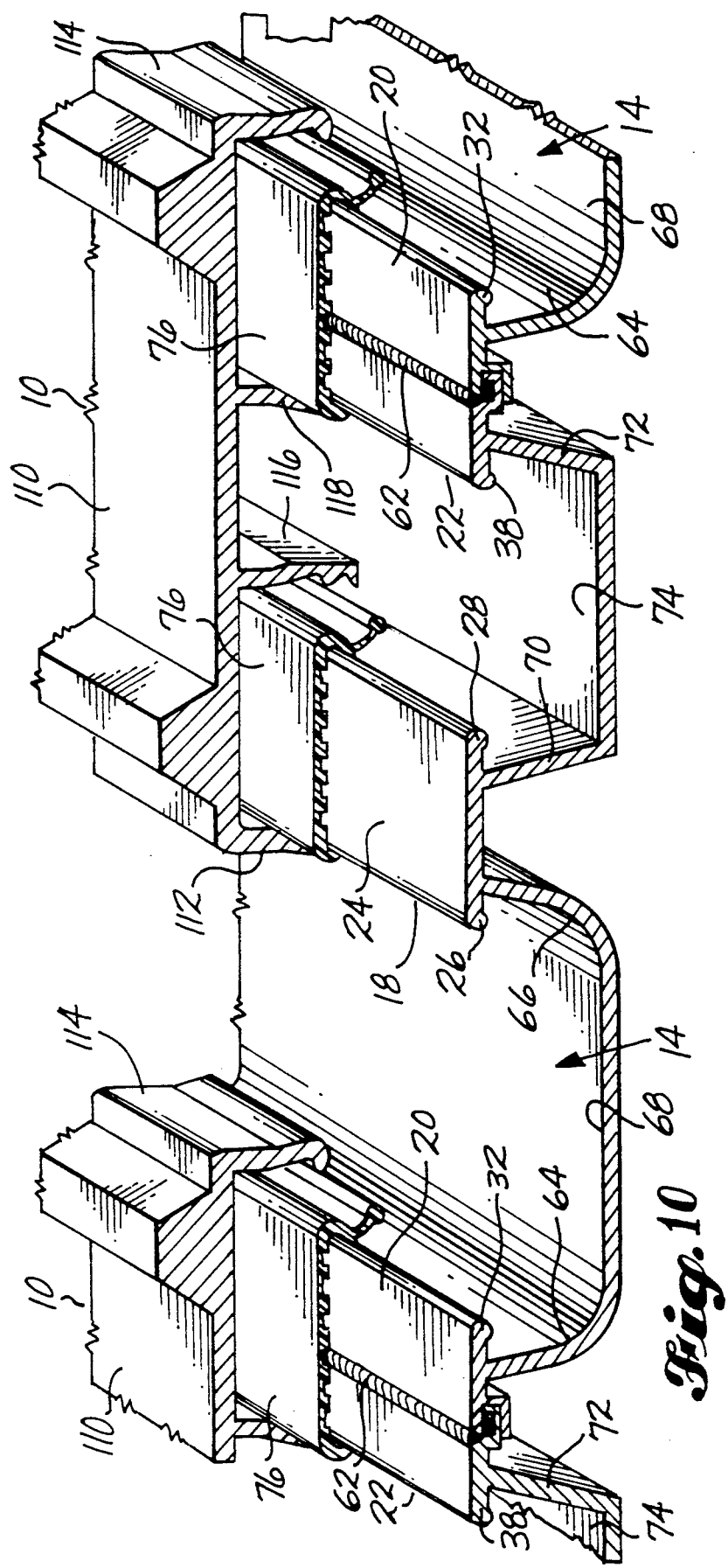

5,238,360

RECIPROCATING FLOOR CONVEYOR WITH LIQUID COLLECTING CHANNELS BETWEEN THE FLOOR MEMBERS

DESCRIPTION

1. Technical Field

This invention relates to reciprocating floor conveyors of a type having laterally spaced apart floor members and channel regions between the floor members. More particularly, it relates to an improved of the floor members, a base structure for supporting and guiding the floor members, and slide bearings on which the floor members slide.

2. Related Application

This is a continuation-in-part of my copending application Ser. No. 07/516,972, filed Apr. 30, 1990, now U.S. Pat. No. 5,145,309 and entitled Container For Liquid Bearing Material.

BACKGROUND INFORMATION

Reciprocating floor conveyors are presently being used in a number of environments. They are being installed as floors in the bottom of large trucks and trailers for use in both loading and unloading cargo. They have a future use in railcars. They have been used in transport vehicles for garbage which includes a considerable amount of liquid. It is undesirable to allow the liquid to drip downwardly from the vehicle while the vehicle travels on roads or railways. Accordingly, there is a need for a reciprocating floor conveyor which is substantially leak proof.

Several embodiments of a leak proof reciprocating floor conveyor are disclosed by my U.S. patent No. Re. 33,196, granted Apr. 10, 1990, and based on my U.S. Pat. No. 4,611,708, granted Sep. 16, 1986. U.S. patent No. Re. 33,196 discloses spacing floor members laterally apart and positioning liquid collection channels between the floor members. U.S. patent No Re. 33,196 also discloses constructing a supporting and guiding base for the floor members from a plurality of identical extrusions which are connected together to form the support base and guiding structure for the floor members A principal object of the present invention is to provide an improved construction of a leak proof floor which includes laterally spaced apart floor members and liquid collection channels between the floor members, and to an improved construction of the bearings and hold down system used with such floor members.

My copending application Ser. No. 07/516,972, filed Apr. 30, 1990, discloses a waterproof floor within a container which also includes a system for collecting water which has drained from the garbage, or some other liquid containing material that is being transported The improved leakproof floor of this invention is usable in a container which also includes the collection system disclosed and claimed in application Ser. No. 07/516,972.

DISCLOSURE OF THE INVENTION

According to an aspect of the invention each floor member of a reciprocating floor conveyor is supported on and by a pair of laterally spaced apart guide beams. Each guide beam extends longitudinally of the conveyor and includes first and second sides and a top. The top includes a first side edge portion which extends outwardly from the first side of its guide beam and a second side edge portion which extends laterally outwardly from the second side of its guide beam. Slide bearings are secured to the guide beams. Each slide bearing has a top portion which sets down on the top of its guide beam, a first side edge channel portion which hooks over the first side portion of the top of its guide beam, and a second side channel portion Which hooks over the second side edge portion of the top of its guide beam. The floor member extends longitudinally of the conveyor. The floor member includes a top portion, a first outside wall which extends downwardly from the top portion at a location outwardly adjacent the first guide beam and a second outside wall which extends downwardly from the top portion outwardly adjacent the second guide beam. The floor member also includes a first inside wall which extends downwardly from the top portion inwardly adjacent the first guide beam and a second inside wall which extends downwardly from the top portion inwardly adjacent the second guide beam The top portion of the floor member has a lower surface extending between the first outside wall and the first inside wall in contact with the top portion of the slide bearing for the first guide beam. The floor member also includes a lower surface which extends between the second outside wall and the second inside wall, in contact with the top portion of the slide bearing for the second guide beam.

In the preferred embodiment, each outside wall of the floor member includes a laterally inwardly directed lip and each slide bearing includes an outwardly and downwardly extending look flange having a lower edge which is positioned above a said lip when the floor member is on the guide beam. The lock flanges are laterally flexible to allow a snap down installation of the floor member onto the bearings and guide beams. During installation of the floor member the lips on the outside walls of the floor member contact the look flanges of the bearings and bend them laterally inwardly as the floor member is moved downwardly. The lower edges of the look flanges are above the lips when the floor member is on the bearings. When the lips are below the lower edges of the lock flanges, the lock flanges spring outwardly into positions above the lips.

In preferred form, the inside walls also include lips which project laterally towards the slide bearings. The inner sides of the slide bearings include lock flanges which extend downwardly and towards the inside walls, into the paths of downward movement of the lips on the inside walls. Preferably also, the inside walls include shoulders extending laterally towards the lock flanges of the slide bearings at a location vertically above the lips. The shoulders are preferably at the same level as the lips on the outside walls. When the floor member is installed, the look flange on each slide bearing which is adjacent an outside wall of the floor member is positioned above the lip on the outside wall of the floor member. The lock flange on the opposite side of the bearing is positioned above the shoulder on its inside wall of the floor member. Unwanted upward movement of the floor member off of the guide beams is blocked by the lock flanges. If a floor member should be moved upwardly an amount moving the shoulders above the lock flanges, the lock flanges will snap into a position above the lips on the inside walls. The look flanges may then hold the floor member until the upward force on it is dissipated, allowing the floor member to settle back onto the bearings and guide beams.

According to another aspect of the invention, a guide beam is provided which extends longitudinally of the conveyor and includes first and second sides and a top. The top includes a first side edge portion which extends laterally outwardly from the first side of the guide beam and a second side edge portion which extends laterally outwardly from the second side of the guide beam. A slide bearing is provided which is adapted to be secured to the top of the guide beam. The slide bearing has a top portion adapted to sit down on the top of the guide beam, a first side channel portion adapted to hook over the first side edge portion of the top of the guide beam, a second side channel portion adapted to hook over the second side edge portion of the top of the guide beam, and a cam portion connected to the second side channel portion. The cam portion permits the slide bearing to be installed by a snap down movement onto the top of the guide beam. The slide bearing is installed by hooking its first side channel portion over the first side edge portion of the top of the guide beam. This places the cam portion in contact with the second side edge portion of the top. A downward movement on the bearing causes the cam surface to move along the second side edge portion of the top. In the process, the second side channel portion of the bearing is opened up until its lower portion clears the second side edge portion of the top. Following such clearance, the second side channel portion of the bearing snaps over the second side edge portion of the top.

According to another aspect of the invention, the guide beams are a part of a base structure which is formed from a plurality of longitudinal base sections which are connected together along longitudinal side edges. The connections occur in top regions of certain guide beams Each base section includes, on a first side, a first side portion of the top of a guide beam and a groove portion of a tongue and groove joint. The groove portion includes a laterally outwardly directed groove Which extends longitudinally of the section adjacent the first top portion of the guide beam. The base section, on its second side, includes a second side portion of the top of a guide beam, and a laterally outwardly directed tongue portion of the tongue and groove joint. The tongue portion extends longitudinally of the section. Each tongue portion fits within the groove portion of the adjacent base section. In preferred form, the tongue and groove are constructed to provide an elongated chamber within the joint when the tongue portion is within a slot portion. An elongated elastomeric seal member is located in this chamber. The seal member is compressed into contact with a surface of the tongue portion and a surface of the groove portion, to seal against leakage at the joint.

According to yet another aspect of the invention, the floor members of the reciprocating floor conveyor are spaced apart and liquid collection channels are provided between the floor members. The floor is constructed to be substantially leak proof so that it can be used on the bottom of a transport container for garbage or some other material which includes a drainable liquid.

Other objects, features and advantages of the invention are hereinafter described in the described in the description of the best mode of the invention.

BRIEF DESCRIPTION OF THE DRAWINGS

In the drawings, like reference numerals are used to designate like parts throughout the several views, and:

FIG. 3 is a reduced scale sectional view of the floor member;

FIG. 4 is a reduced scale sectional view of an extruded member which is interconnected with a plurality of light members to form guide beams for the floor members and liquid collection channels between adjacent floor members;

FIG. 5 is a fragmentary enlarged scale sectional view showing a bearing in the process of being snap fitted onto a top portion of a guide beam;

FIG. 6 is a fragmentary sectional view of a joint between adjacent guide beams/channel forming members, such view showing a seal strip compressed with a seal strip chamber, for sealing the joint;

FIG. 7 is a view like FIG. 6, but showing the seal strip omitted and the two members welded together;

FIG. 10 is a fragmentary pictorial view of the conveyor floor.

BEST MODE FOR CARRYING OUT THE INVENTION

Figure 1:
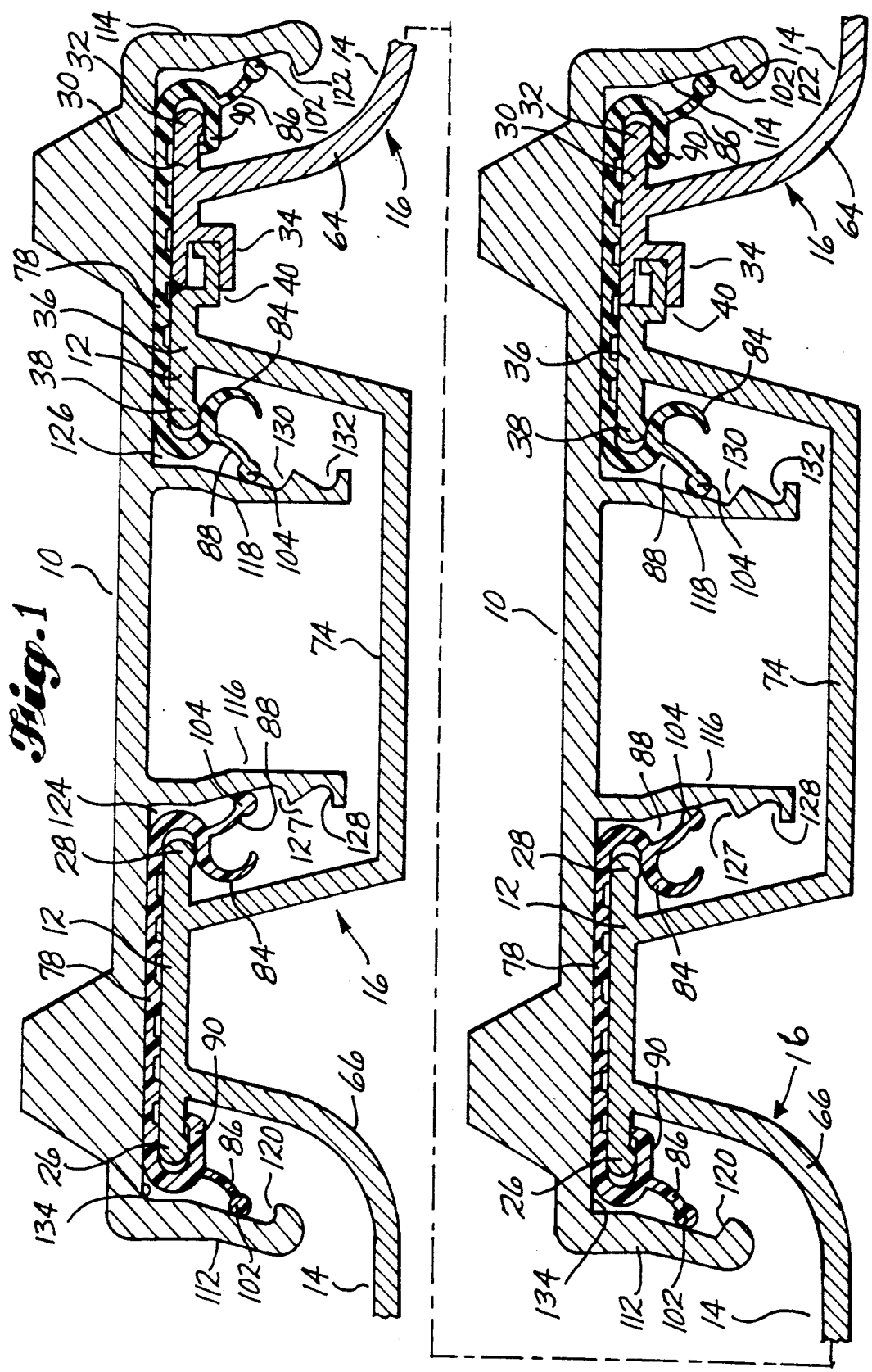
FIG. 1 is a two part sectional view taken transversely of a portion of a reciprocating floor conveyor, With the first part shown above the second part.
Figure 9:
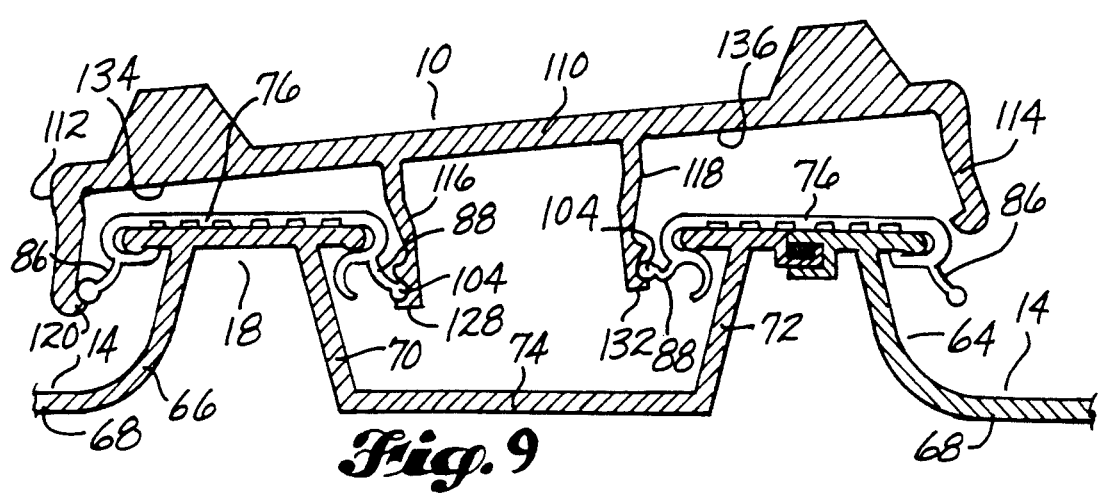
FIG. 9 is a sectional view showing a partially lifted floor member being restrained against additional upward movement by hold down flaps which are a part of the bearings.

As shown by FIGS. 1, 9 and 10, the reciprocating floor conveyor of the present invention comprises a plurality of laterally spaced apart floor members 10, each of which is supported by and on a pair of guide beams 12. Liquid collection channels 14 are provided between the floor members 10. The length and width of the conveyor, and the number of floor members 10, and the width of the floor members 10 and the channels 14, are all variables. In a typical installation, the length of the conveyor may vary between 20 and 40 feet, for example. The conveyor may vary between 9, 12 or 15 floor members in width, for example. As shown in my aforementioned U.S. Pat. No. Re. 33,196, the conveyor is divided into sets and groups of floor members 10. In preferred form, there are three sets of floor members 10. Each group includes one floor member from each set. In each group, a floor member from the second set is positioned between floor members in the first and third sets. The drive mechanism for the floor members moves the floor members in a first direction for advancing a load and retracts the floor members in the opposite direction. In preferred form, all of the floor members are moved in unison to convey the load. The floor members are then retracted one set at a time back to a start position. When floor members "1" are being retracted, the floors members "2" and "3" are stationary and they hold the load substantially stationary. This is because they have twice as much area in contact with the load and thus present a larger friction force to the load. As explained in Patent No. Re. 33,196, the sides of the floor members presents an area to the material which is located in the channels between the floor members. After floor members "1" are retracted, the floor members "2" are retracted while floor members "1" and "3" are stationary. Floor members "3" are then retracted while floor members "1" and "2" are stationary. When all of the floor members are back at the start position, all floor members are then moved in unison to the advanced position, to convey the load. The drive mechanism is not per se a part of the present invention. By way of example, the drive mechanism may be of the type disclosed in my U.S. Pat. No. 4,817,783, granted Apr. 4, 1989, or in my U.S. Pat. No. 5,000,647, granted Mar. 19, 1991.

As shown in FIGS. 1, 4, 9 and 10, the support and guide base for the floor members 10 is constructed from a plurality of interconnected extrusions 16. In preferred form, each extrusion extends the full length of the conveyor and has a cross-sectional configuration of the type shown by FIG. 4. Referring to FIG. 4, each extrusion 16 includes a full guide beam 18 and two guide beam sections 20, 22. Guide beam 18 includes a top wall 24 and side edge portions 26, 28. Side edge portions 26, 28 are lateral extensions of the top wall 24. Guide beam section 20 includes a half top 30, a laterally extending side edge portion 32, and a groove portion 34 of a tongue and groove connection. Guide beam section 22 includes a top section 36, a laterally extending side edge portion 38, and a tongue portion 40 of the tongue and groove connection. When a guide beam section 22 of one extrusion 16 is connected to the guide beam section 20 of the adjacent extrusion 16, together they form a guide beam 20, 22 which is essentially identical in cross sectional shape to guide beam 18.

FIGS. 6 and 7 show two ways of constructing the tongue and groove joint. Firstly, the groove has a first side portion 42 which is a part of its top section 30, and a second side portion 44. Side portion 44 is spaced from side portion 42 and is connected to side portion 42 by means of a perpendicular wall 46. Together, side portions 42, 44 and wall 46 define a substantially rectangular groove or channel having a laterally directed open side which receives the tongue 40. Tongue 40 includes a bottom wall 4B which is offset below its top portion 36. A perpendicular wall 50 extends between top portion 36 and bottom wall 48. An upwardly directed lip 52 extends upwardly from the outer edge of bottom 48. Wall 50, bottom 48 and lip 52 together define a channel space 54 which has an upwardly directed open side. When tongue 40 is within groove 34, the bottom 48 of tongue 40 rests on side 44 of groove 34. A space is formed within the joint, vertically between side 42 of groove 34 and bottom 48 of tongue 40, and horizontally between wall 50 and lip 52 of the tongue 40. This space extends longitudinally of the extrusion 16. The corner intersection of portions 36, 50 of tongue 40 may include a bevel surface 56. In similar fashion, the upper corner of wall 42 of groove 34 may include a bevel 58. When the joint is connected, the bevels 56, 58 define a V-groove which extends longitudinally of the extrusions 16.

As shown in FIG. 6, an elastomeric seal member 60 may be Positioned within the longitudinal cavity 54. The seal member 60 may have a substantially circular or oval cross-sectional shape. It is constructed to have a vertical dimension that is larger than the vertical dimension of the longitudinal cavity 54. Seal strip 60, when used, is placed within the channel portion of the tongue 40. Then, the tongue 40 is united with the groove 34 of the adjacent extrusion 16. In the process, the seal member 60 is compressed vertically. This stores energy in seal member 60 which serves to exert a pressure on the inner surfaces of wall 42 and bottom 48. The pressure provides a tight sealing contact between seal member 60 and the inner surfaces of wall 42 and bottom 48.

As shown by FIG. 7, the seal strip 60 may be omitted and the tongue and groove 40, 34 be welded together at the V-groove 56, 58. FIG. 7 shows a weld bead 62 in the V-groove 56, 58 (FIG. 6). The weld bead is applied and is then ground flat at its top, so that the top of the weld bead 62 is substantially flush with the top surfaces 30, 36.

Figure 2:
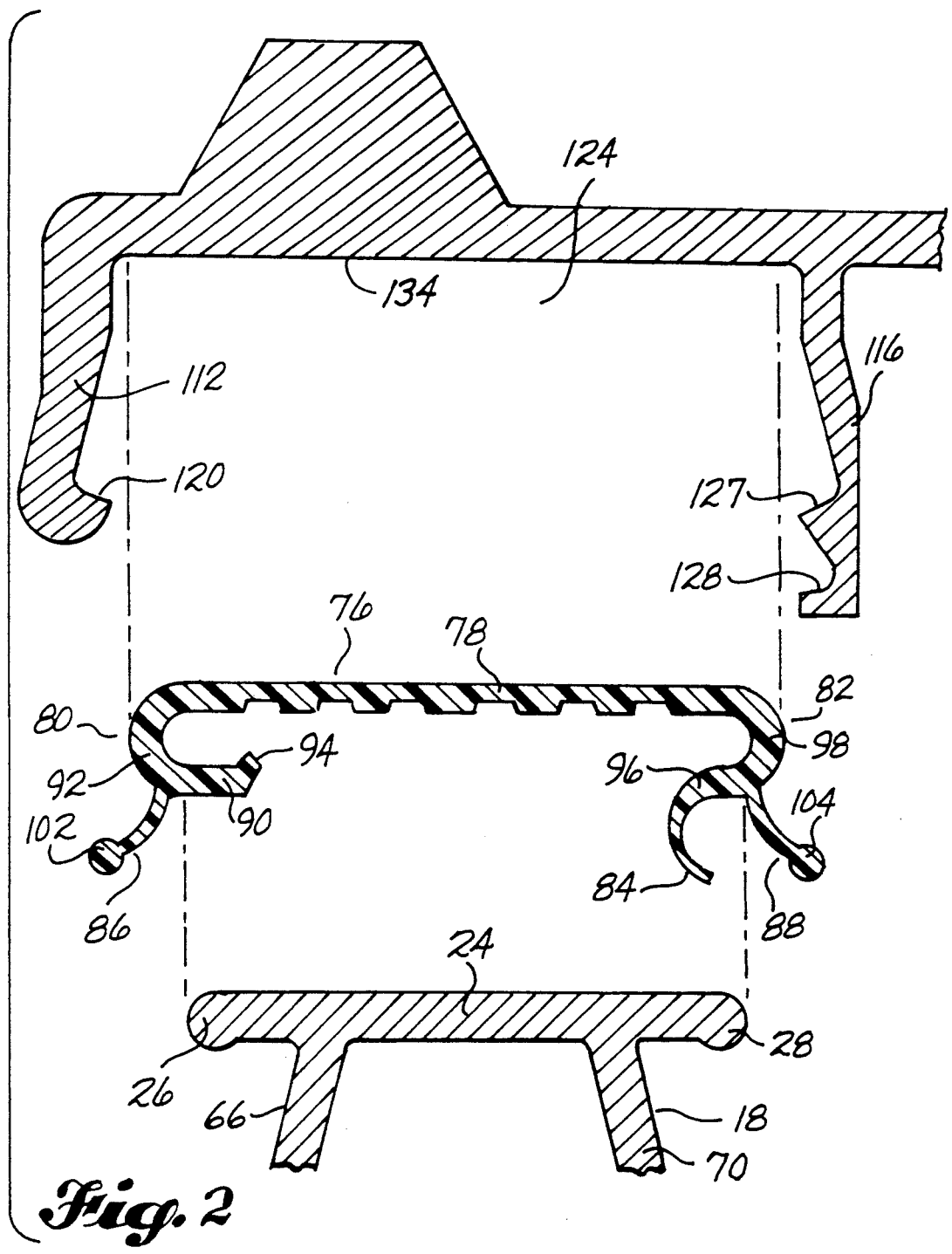
FIG. 2 is an exploded fragmentary sectional view of a side portion of the floor member, an upper portion of a support member, and a bearing which is installed on the support member and onto which the side portion of the floor member is installed.
Figure 8:
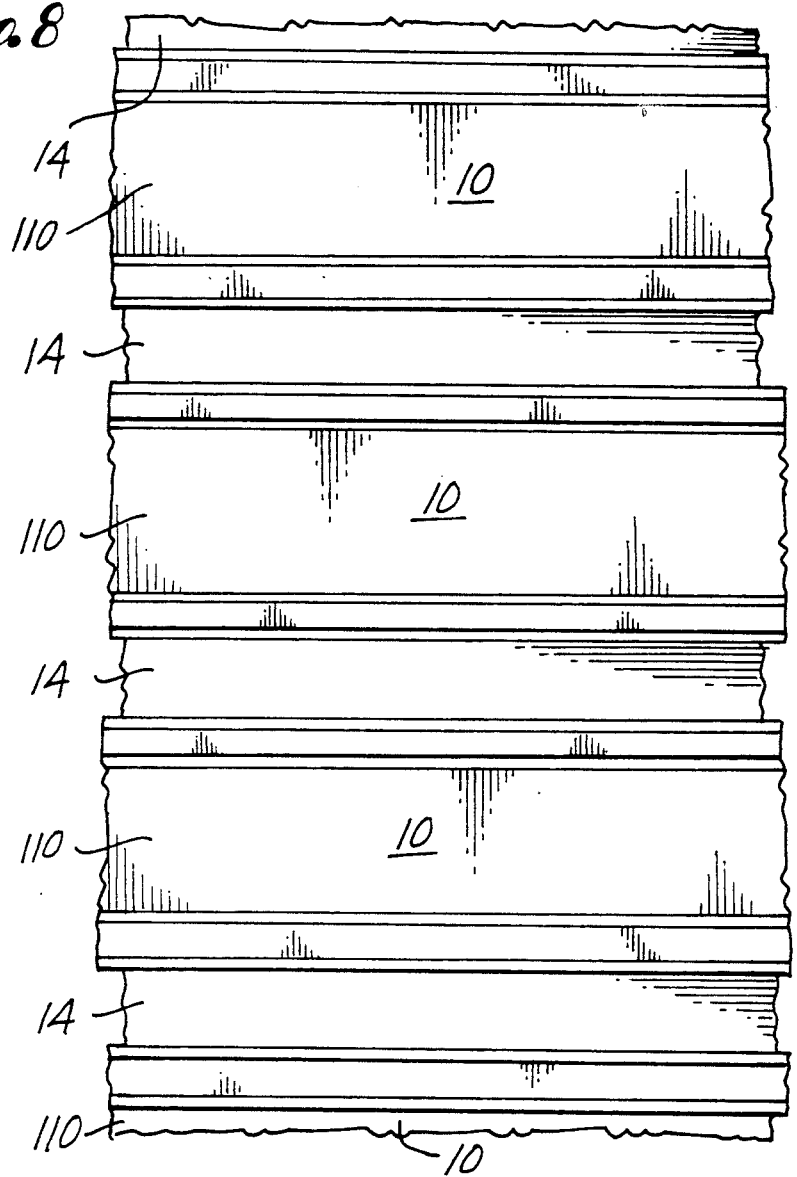
FIG. 8 is a fragmentary top plan view of the conveyor floor.

As shown by FIG. 4, a sidewall 64 of guide beam section 20 is connected to sidewall 66 of guide beam 18, by means of a bottom wall 68. Walls 64, 66, 68 define a liquid collecting channel. Side 70 of guide beam 18 is connected to a side 72 of guide beam section 22, by means of a bottom wall 74. Walls 70, 72, 74 define a channel, the primary purpose of which is to connect together guide beam 18 and a guide beam formed by the connection of guide beam section 22 with the guide beam section 20 of the adjacent extrusion 16. As clearly shown by FIGS. 1, 9 and 10, each floor member 10 sets down on and is supported by a guide beam 18 and an adjacent guide beam 22, 20. Slide bearings 76 snap fit onto the top walls 24 and 30, 36 of the guide beams 18 and 20, 22. Slide bearings 76 may be constructed in long or short sections. Preferably, the bearings are extruded from a self-lubricated plastic material. Referring to FIGS. 1, 2, 5, 9 and 10, a slide bearing 76 is composed of a top portion 78, a first side channel portion 80, a second side channel portion 82, a cam portion 84, a first lock flange 86 and a second lock flange 88. Side channel portion 80 includes a bottom flange 90 and a bight portion 92 which extends between the top portion 78 and the flange 90. Flange 90 may include an upwardly directed lip 94. Side channel portion 82 includes a lower wall portion 96 and a bight portion 98 which interconnects top 78 and wall portion 96. Wall portion 96 is located between bight portion 98 and cam portion 84. Bight portion 98, wall portion 96 and cam portion 84 have a substantially S-shaped cross sectional shape. Look flange 86 extends downwardly and outwardly from bottom flange 90. Lock flange 88 extends downwardly and outwardly from wall 96. Lock flange 86 includes a lower edge portion in the form of a circular bead 102. In like fashion, lock flange 88 includes a lower edge portion in the form of a circular bead 104. FIG. 2 shows the natural or unstressed configuration of the bearing 76.

Referring to FIG. 5, the installation of a bearing 76 on a guide beam 18 involves the following steps. Firstly, the bearing 76 is located generally above and to one side of a guide beam 18. Then, bearing 76 is moved to hook side channel portion 80 onto the side edge portion 26 of top 24, and place cam 84 against an upper part of side edge portion 28, as shown by FIG. 5. Next, a downward force, indicated by arrow 106, is applied to the top portion 78 of bearing 76. This downward force 106 causes cam 84 to move relatively along the upper side surface of side edge portion 28. The action of cam 84 on surface 108 opens up the side channel portion 82 until wall 96 is substantially below the side edge portion 28. In response to additional downward movement of bearing 76, the wall portion 96 moves into a position below side edge portion 28. Thus, presence of cam 84 allows the bearing 76 to be snap fitted on the top 24 of the guide beam 18.

A bearing 76 may be installed onto a guide beam 20, 22 in the same manner. The bearing 76 may be rotated 180° to place the cam 84 towards the center of the floor member 10. Referring in particular to FIG. 3, each floor member 10 includes a top portion 110, first and second outside walls 112, 114, and first and second inside walls 116, 118. Walls 112, 114, 116, 118 all extend downwardly from the top portion 110. Wall 112 includes a laterally inwardly directed lip 120 at its lower edge. In similar fashion, wall 114 includes a laterally inwardly directed lip 122 at its lower edge. A first guide beam space 124 is defined by and between walls 112, 116. A second guide beam space 126 is defined by and between walls 114, 118. Wall 116 includes a shoulder 127 and a lip 128, each of which is directed laterally into the guide beam space 124. In like fashion, wall 116 includes a shoulder 130 and a lip 132 which extend laterally into the guide beam space 126. Shoulders 127, 130 have upper surfaces which are substantially at the same level as the upper surfaces of the lips 120, 122.

Each floor member 10 is installed in the following manner. The floor member 10 is positioned over a pair of adjacent guide beams 18 and 20, 22. Guide beam 18 is aligned with guide beam space 124. Guide beam 20, 22 is aligned with guide beam space 126. As the floor member 10 is lowered, the lip 128 contacts the look flange 88 on the bearing 76 that is on guide beam 18. Lip 132 contacts the look flange 88 on the bearing 76 that is on the guide beam 20, 22. As the floor member 10 moves downwardly, the lips 128, 132 push the lock flanges 88, laterally until the lips 128, 132 are below the beads 104. Lip 120 and shoulder 127 then contact the look flanges 86, 88 of the bearing 76 which is on guide beam 18. Shoulder 130 and lip 122 contact the look flanges 86, 88 of the bearing 76 that is on the guide beam 20, 22. As downward movement proceeds, the lips 120, 122 and the shoulders 127, 130 exert laterally directed forces on the lock flanges 86, 88, bending them until the lips 120, 122 and the shoulders 127, 130 are below the beads 102, 104. This happens slightly before the surfaces 134, 136 of the floor member 10 contact the top portions 78 of the bearings 76. When the lips 120, 122 and the shoulders 127, 130 are below the beads 102, 104, the lock flanges 86, 88 swing outwardly into positions above the lips 120, 122 and the shoulders 127, 130. This is shown in FIGS. 1 and 10. The beads 102, 104 serve to lock the floor member into a position on the bearings 76 and guide beams 18 and 20, 22.

Lips 128, 132 are provided to provide additional protection against a floor member 10 being lifted up off of its guide beams. As shown by FIG. 9, if a floor member 10 is forced upwardly, the lock flange beads 104 will move into engagement with lips 128, 132, and together with lock flange 86 acting on lip 120, will exert a hold down force on the floor member. This increases the chances of the floor member 10 being retained on the guide beams 18 and 20, 22 long enough for the lifting force to be dissipated, enabling the floor member 10 to settle back onto the guide beams 18 and 20, 22.

The illustrated embodiment is an example of the invention. The scope of protection is not to be limited by such embodiment but rather is to be determined by an interpretation of the following claims, following established rules of patent claim interpretation, including use of the doctrine of equivalents.

What is claimed is:

1. A reciprocating floor conveyor, comprising:

a pair of laterally spaced apart guide beams, each guide beam extending longitudinally of the conveyor and including first and second sides and a top, each said top including a first side edge portion which extends outwardly from the first side of its guide beam and a second side edge portion which extends laterally outwardly from the second side of its guide beam;

a slide bearing for each guide beam, said slide baring having a top portion which sets down on the top of its guide beam, a first side channel portion which hooks over the first side edge portion of the top of its guide beam, and a second side channel portion which hooks over the second side edge portion of the top of its guide beam; and a floor member extending longitudinally of the conveyor, said floor member having a top portion, a first outside wall which extends downwardly from the top portion at a location outwardly adjacent the firs guide beam, a second outside wall which extends downwardly from the top portion outwardly adjacent the second guide beam, a first inside wall which extends downwardly from the top portion inwardly adjacent the first guide beam, and a second inside wall which extends downwardly from the top portion inwardly adjacent the second guide beam, said top portion of the floor member having a first lower surface extending between the first outside wall and the first inside wall in contact with the top portion of the slide bearing for the first guide beam, and a second lower surface which extends between the second outside wall and the second inside wall, in contact with the top portion of the slide bearing for the second guide beam, said contact of said first and second lower surfaces with the top portions of the slide bearings facilitating longitudinal movement of the floor member along the guide beams.

2. A reciprocating floor conveyor according to claim 1, wherein each outside wall of the floor member includes a laterally inwardly directed lip, and each slide bearing includes an outwardly and downwardly extending lock flange having a lower edge which is positioned above a said lip when the floor member is on the guide beams.

3. A reciprocating floor conveyor according to claim 2, wherein the lock flanges are laterally flexible to allow a snap down installation of the floor member onto the bearings and guide beams, wherein during installation of the floor member the lips on the outside walls of the floor member contact the lock flanges of the bearings and bend them laterally inwardly as the floor member is moved downwardly, wherein the lower edges of the lock flanges are above said lips when the floor member is on the bearings, ad wherein when the lips are below the lower edges of the lock flanges, said lock flanges spring outwardly into positions above the lips.

4. A reciprocating floor conveyor according to claim 2, wherein the first inside wall includes a first lip which projects laterally towards the slide bearing which is on the first guide beam, and said second inside wall includes a second lip which extends laterally towards the bearing that is on the second guide beam, wherein the slide bearing on the first guide beam includes a lock flange which extends downwardly and towards said first inside wall, into a position above the first lip, and wherein the slide bearing on the second guide beam includes a lock flange which extends downwardly and towards the second inside wall, into a position above the second lip.

5. A reciprocating floor conveyor according to claim 4, wherein each inside wall includes a shoulder extending laterally towards the lock flange of its bearing, said shoulder being positioned vertically above the lips on the inside wall.

6. A reciprocating floor conveyor according to claim 5, wherein the shoulders on the inside walls are substantially at the same level as the lips on the outside walls.

7. A reciprocating floor conveyor according to claim 1, wherein the first inside wall includes a first lip which projects laterally towards the slide bearing which is on the first guide beam, and said second inside wall includes a lip which extends laterally towards the bearing that is on the second guide beam, wherein the slide bearing on the first guide beam includes a lock flange which extends downwardly and towards said first inside wall, into a position above the first lip, and the slide bearing on the second guide beam includes a lock flange which extends downwardly and towards the second inside wall, into a position above the second lip.

8. A reciprocating floor conveyor according to claim 7, wherein each inside wall includes a shoulder extending laterally towards the lock flange of its bearing, said shoulders being positioned vertically above the lips on the inside walls.

9. In a reciprocating floor conveyor which includes a base structure formed from a plurality of longitudinal base sections which are connected together along longitudinal side edges, said base structure providing a plurality of laterally spaced apart guide beams and channels between the guide beams, said guide beams supporting slide bearings and said slide bearings in turn supporting longitudinal floor members which are moved longitudinally in one direction to convey a load and are retracted in the opposite direction, an improved connection between adjacent base sections, comprising:
  each base section including first and second opposite side portions,
  said first side portion including a sidewall and a first side portion of a top of a guide beam, and a groove portion of a tongue and groove joint, said groove portion including a laterally outwardly directed groove which extends longitudinally of the section adjacent said first top portion of the guide beam,
  said second side portion of the base section including a sidewall and a second side portion of the top of a guide beam, and a laterally outwardly directed tongue portion of said tongue and groove joint, said tongue portion extending longitudinally of the section,
  said tongue portion of each base section extending into a groove portion of adjacent base section,
  said tongue portion and said groove portion, together defining a seal space which extends longitudinally of the base structure; and
  an elongated elastomeric seal member within said seal space.

10. A reciprocating floor conveyor, comprising:
  a base structure formed from a plurality of longitudinal base sections which are connected together along longitudinal side edges, said base structure provided a plurality of laterally spaced apart guide beams and channels between the guide beams, each base section including first and second opposite side portions, said first side portion including a sidewall, a first side portion of a top of a guide beam, and a grooved portion of a tongue and groove joint, said second side portion of the base section including a sidewall, a second side portion of the top of a guide beam, and a laterally outwardly directed tongue portion of said tongue and groove joint, said tongue portion extending longitudinally of the section within the groove portion of an adjacent base section;
  with the top of each guide beam including a first laterally extending side edge portion and a laterally extending second side edge portion;
  a slide bearing for each guide beam, said slide bearing having a top portion which sets down on to of its guide beam, a first side channel portion which hooks over the first side edge portion of the top of the guide beam, and a second side channel portion which hooks over the second side edge portion of the top of its guide beam; and
  a plurality of floor members, wherein each floor member extends longitudinally of the conveyor and is supported by a pair of adjacent guide beams, each said floor member having a top portion, a first sidewall which extends downwardly from the top portion at a location outwardly adjacent a first guide beam, a second sidewall which extends downwardly from the top portion outwardly adjacent the second guide beam.

11. A reciprocating floor conveyor according to claim 10, wherein each sidewall of the floor member includes a laterally inwardly directed lip, and each slide bearing includes an outwardly and downwardly directed lock flange having a lower edge which is positioned above said lip when the floor member is on the guide beams.

12. A reciprocating floor conveyor according to claim 11, wherein each floor member includes a first inside wall which extends downwardly from the top portion of the floor member, inwardly adjacent the first guide beam, and a second inside wall which extends downwardly from the top portion of the floor member, inwardly adjacent the second guide beam, said top portion of the floor member having a lower surface extending between the first sidewall and the first inside wall, in contact with the top portion of the slide bearing on the first guide beam, and a lower surface which extends between the second sidewall and the second inside wall, in contact with the top portion of the slide bearing on the second guide beam.

13. A reciprocating floor conveyor according to claim 12, wherein the first inside wall includes a first lip which projects laterally towards the slide bearing which is on the first guide beam, and said second inside wall includes a lip which extends laterally towards the slide bearing that is on the second guide beam, wherein the slide bearing on the first guide beam includes a lock flange which extends downwardly and towards said first inside wall, into a position above the first lip, and wherein the slide bearing on the second guide beam includes a lock flange which extends downwardly and towards the second inside wall, into a position above the second lip.

14. A reciprocating floor conveyor according to claim 13, wherein each inside wall includes a shoulder extending laterally towards the looked flange of its bearing, said shoulders being positioned vertically above the lips on the inside walls.

15. A reciprocating floor conveyor according to claim 14, wherein the shoulders on the inside walls are substantially at the same level as the lips on the outside walls.

* * * * *

UNITED STATES PATENT AND TRADEMARK OFFICE
CERTIFICATE OF CORRECTION

PATENT NO. : 5,238,360

DATED : August 24, 1993

INVENTOR(S) : R. Keith Foster

Page 1 of 2

It is certified that error appears in the above-identified patent and that said Letters Patent is hereby corrected as shown below:

On title page, item [57] Abstract, 2nd column,
    the 5th line from the top, "look" should be -- lock --;
    the 10th and 11th lines from the top, "Walls" should be -- walls --; the 2nd line from the bottom, delete "35".

Column 1, line 11, after "improved", insert -- construction --.
Column 1, lines 43, 44, there is a period after "members".
Column 1, lines 54, 55, there is a period after "transported".
Column 2, line 4, after "side", delete "edge"; and in line 5, after "side", insert -- edge --.
Column 2, line 6, "Which" should be -- which --.
Column 2, line 19, there is a period after "beam".
Column 2, line 31, "look" should be -- lock --.
Column 2, lines 37, 40, 54 and 65, "look" should be -- lock --.
Column 3, line 35, there is a period after "beams".
Column 3, line 39, "Which" should be -- which --.
Column 3, line 63, "desoribed" should be -- described --.
Column 4, line 2, "With" should be -- with --.
Column 5, line 41, "4B" should be -- 48 --.
Column 5, line 60, "Positioned" should be -- positioned --.
Column 6, line 43, "Look" should be -- Lock --.
Column 7, lines 26, 28, 32 and 34, "look" should be -- lock --.

UNITED STATES PATENT AND TRADEMARK OFFICE
CERTIFICATE OF CORRECTION

PATENT NO. : 5,238,360
DATED : August 24, 1993
INVENTOR(S) : R. Keith Foster

It is certified that error appears in the above-identified patent and that said Letters Patent is hereby corrected as shown below:

Claim 1, column 8, line 9, "baring" should be -- bearing --.
Claim 1, column 8, line 20, "firs" should be -- first --.
Claim 3, column 8, line 55, "ad" should be -- and --.
Claim 5, column 9, line 7, "wall" should be -- walls --.
Claim 10, col. 9, line 62, "provided" should be -- providing --.
Claim 10, col. 10, line 11, "on to of" should be -- on top of -.
Claim 14, column 10, line 61, "looked" should be -- locked --.

Signed and Sealed this

Eighteenth Day of October, 1994

Attest:

BRUCE LEHMAN

Attesting Officer

Commissioner of Patents and Trademarks